(12) United States Patent
Horvitz et al.

(10) Patent No.: US 7,039,642 B1
(45) Date of Patent: May 2, 2006

(54) DECISION-THEORETIC METHODS FOR IDENTIFYING RELEVANT SUBSTRUCTURES OF A HIERARCHICAL FILE STRUCTURE TO ENHANCE THE EFFICIENCY OF DOCUMENT ACCESS, BROWSING, AND STORAGE

(75) Inventors: Eric J. Horvitz, Kirkland, WA (US); Paul Koch, Toronto (CA)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 09/849,644

(22) Filed: May 4, 2001

(51) Int. Cl.
*G06F 17/30* (2006.01)

(52) U.S. Cl. ...................... 707/100; 709/218
(58) Field of Classification Search .............. 707/1–10, 707/100–104.1; 709/218, 223
See application file for complete search history.

(56) References Cited

U.S. PATENT DOCUMENTS

| | | | |
|---|---|---|---|
| 5,276,874 A * | 1/1994 | Thomson .................... | 707/102 |
| 5,493,692 A | 2/1996 | Theimer et al. | |
| 5,521,910 A * | 5/1996 | Matthews .................... | 370/256 |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,752,217 A * | 5/1998 | Ishizaki et al. ............. | 701/201 |
| 5,905,900 A * | 5/1999 | Combs et al. ............... | 713/320 |
| 6,067,565 A * | 5/2000 | Horvitz ....................... | 709/218 |
| 6,085,226 A * | 7/2000 | Horvitz ....................... | 709/203 |
| 6,148,294 A * | 11/2000 | Beyda et al. ................. | 707/1 |
| 6,182,133 B1 * | 1/2001 | Horvitz ....................... | 709/223 |
| 6,370,119 B1 * | 4/2002 | Basso et al. ................. | 370/252 |
| 6,370,538 B1 * | 4/2002 | Lamping et al. ............ | 707/102 |
| 6,389,427 B1 * | 5/2002 | Faulkner ...................... | 707/104.1 |
| 6,466,232 B1 | 10/2002 | Newell et al. | |
| 6,513,046 B1 | 1/2003 | Abbott, III et al. | |
| 6,549,896 B1 * | 4/2003 | Candan et al. ................ | 707/2 |
| 6,549,915 B1 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B1 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |

(Continued)

OTHER PUBLICATIONS

Van Wijk, J.J., et al.; "Cushion Treemaps: Visualization of Hierarchical Information", Proceedings 1999 IEEE Symposium on Information Visualization, 1999, p. 73-78, 147.

(Continued)

*Primary Examiner*—Leslie Wong
(74) *Attorney, Agent, or Firm*—Amin & Turocy, LLP

(57) ABSTRACT

A system and methodology is provided for improving directory operations within a system providing an electronic hierarchical directory of items. The system includes a component which analyzes probabilities and utilities associated with determining potential target directories for storing and accessing data, and a component for building a subset of the potential target directories that are predicted to be the target directory. The probabilities and/or utilities are functions of expected navigation costs associated with traversing from a displayed directory to at least one of the potential target directories. Methods in accordance with the present invention can be coupled with displays of substructures that format the substructures into a coherent hierarchical view.

27 Claims, 11 Drawing Sheets

U.S. PATENT DOCUMENTS

| | | |
|---|---|---|
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0087649 A1* | 7/2002 | Horvitz ...................... 709/207 |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2005/0034078 A1 | 2/2005 | Abbott et al. |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No.1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Interence, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265-No. 3.

* cited by examiner

DECISION-THEORETIC METHODS FOR IDENTIFYING RELEVANT SUBSTRUCTURES OF A HIERARCHICAL FILE STRUCTURE TO ENHANCE THE EFFICIENCY OF DOCUMENT ACCESS, BROWSING, AND STORAGE

TECHNICAL FIELD

The present invention relates generally to computer systems, and more particularly to a system and methodology to mitigate navigation costs associated with browsing, saving and opening files by determining and providing a relevant substructure of likely candidate nodes wherein a user can save, open and/or browse a desired file.

BACKGROUND OF THE INVENTION

Computer systems and related technologies have become a staple in all aspects of modern society. Thus, people have come to rely on these systems as a tool for both personal and professional needs, wherein many systems process and store vast amounts of data, files and other information on a daily basis. For example, it is not uncommon for a single user to access, generate and/or save a plurality of text files, spread sheet files, presentation files, Internet files, and E-mail files, to name but a few examples, each day. Since computers have become tools of necessity for processing these ever growing amounts of data and files, users have increasingly become burdened with managing larger quantities of such information. These burdens and associated inefficiencies generally increase as the amount of data and files increase on the computer system. For example, files are often stored on a computer in a vertical and horizontal tree structure, wherein files stored at the same directory level maintain a horizontal relationship with each other and files stored in lower subdirectories maintain a vertical relationship with those directories and subdirectories higher up in the tree. Unfortunately, as computer systems have evolved, and as more data is stored on each system causing these tree structures to grow, conventional file access and management systems require users to spend more and more time navigating throughout these structures when accessing, saving and/or browsing files. This becomes expensive since users are spending greater amounts of time navigating and searching for desired file destinations as opposed to actually operating on the files.

One example of time inefficiency associated with conventional file management systems relates to saving files. Often times, as users are operating upon files, the need arises to save files in another directory. When presented with options and/or locations for saving such files, the user many times has to search and navigate through a complex tree of directories and files to find the location wherein the files are ultimately saved. For example, when saving an opened file in another directory than the current file directory, the user must often navigate up or down to another subdirectory (e.g., mouse stroke clicking on alternate directory nodes), and then peruse an exhaustive list of related directories and subdirectories at various levels before finding a desired directory to store the file. Moreover, the user often has to scan large lists of files on the way to a destination directory thereby increasing the time of finding the desired directory. As is usually the case, the user can expend significant amounts of time merely traversing the directory tree structures searching for the desired directory or subdirectory to store the file. When operating upon many such files every day, these time inefficiencies are multiplied and can become quite costly. Another common scenario of time inefficiency relates to E-mail systems and processing. As an example, files are often attached or appended to an E-mail wherein the E-mail recipient often desires to detach the file and save/place the file in a directory or subdirectory. This usually involves searching and "drilling down" through many unrelated directories in a somewhat linear manner before finding the desired directory to save the associated file.

File navigation and searching problems also relate to other aspects of conventional file management systems. For example, users often desire to open/read a related file when operating upon another file. This may occur when a first file (e.g., text, spreadsheet file) is currently opened and a second file needs to be opened for review and/or for retrieving portions of the second file for utilization in the first file. As is the case with finding a suitable location for saving a file, opening a desired file presents similar navigation and searching problems. Often extensive searches are conducted in the directory tree structure to find the desired file to open. In a similar context, merely browsing a tree structure for a desired file to initially open and/or retrieve, can require tedious searching through a list of unlikely directories and subdirectories before finding the file of interest.

In view of the above problems associated with conventional file management and access systems, there is a need for a system and/or methodology to mitigate navigation costs associated with traversing directory tree structures to facilitate improved efficiency file access, save and browsing operations.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to enable intelligent display and accessing of likely candidate subdirectories during file save, access, browsing and/or other directory operations. In accordance with the present invention, a user's long-term and recent directory activities (e.g., file accesses) are profiled in order to determine and display the most likely subdirectory tree structure the user is likely to employ when directory access is required. In this manner, exhaustive searches and traversals through unlikely potential subdirectories are mitigated during file access operations. A user when attempting to open, save and/or browse a file for example, may be presented with a candidate tree structure by harnessing a decision-theoretic analysis that employs probabilistic information on the likelihood of different target directories that are inferred based upon recent and/or long-term directory activity and/or document properties (e.g., the type of document such as an MS Word file, an MS Excel file, etc., and the content of the document), as well as the costs of navigating from candidate nodes in the directory structure to other nodes to find the desired or target information. Thus, a reformulated, focused directory structure, potentially including multiple views or perspectives composed from tree fragments drawn from the comprehensive directory structure, is provided to enable efficient (e.g., reducing the number of subdirectories to traverse or browse) accessing of the desired file. The analysis is based on considering the expected costs of navigating from different target nodes to the target files.

More particularly, the present invention utilizes decision-theoretic analysis to present users with likely candidate substructures to access, save, and browse desired files. The candidate substructures provided to the user represent a reduced subset of all possible directories in which the user must peruse and traverse during directory operations. In this manner, time is saved and computer efficiency is increased since users are presented a compact and highly relevant list of the most likely directories in which to operate as opposed to having to navigate and search through a maze of intermediate nodes and associated file lists before selecting a desired destination. The likely candidate structures are constructed by first assigning probabilities to directories based upon recent and long-term file activities. For example, long-term probabilities are increased if a directory has had many files stored in that directory in the past. Likewise, a directory having many files of a similar type will also have a higher probability of being a likely destination and/or target directory. Recent activity probabilities may be assigned based upon frequency that a directory or subdirectory has been accessed within a predetermined amount of time (e.g., background monitor counting number of times files in a directory are opened in past two weeks). Directories that are accessed more often are assigned higher probabilities of being the likely destination directory.

After probabilities have been assigned, an expected utility evaluation is conducted for a plurality of nodes within a predetermined proximity to the current directory. Expected utility is a measure of how likely a directory is the intended target directory. Expected utility may be determined by assigning a utility factor to each directory node under consideration, multiplying the utility factor of each node times the probabilities assigned to each node, and summing these products for all nodes under consideration. The utility factor is inversely related to the costs associated with navigating to another node to perform a desired directory operation. Additionally a penalty factor may be included with the utility factor that indicates a cost of viewing a list within a directory based upon the number of files or nodes appearing in the list. As the utility factor decreases, and/or penalty factor increases, the likelihood that a directory is the target directory decreases. After determining expected utility for each directory node, a likely candidate substructure may be presented to the user in order of the highest expected utility that the displayed directories are most likely to be selected, and thus mitigate having to traverse through unrelated and/or unwanted directories.

In accordance with an aspect of the present invention, a system is provided for predicting a target file directory. The system includes a component which analyzes probabilities and utilities associated with determining potential target directories for storing and accessing data and a component for building a subset of the potential target directories that are predicted to be the target directory, wherein the probabilities and/or utilities are functions of navigation costs associated with traversing from a displayed directory to at least one of the potential target directories.

According to another aspect of the present invention, a method is provided for determining a potential target node for directory operations. The method includes:

assigning probabilities and utilities to a plurality of potential target nodes; determining an expected utility from the probabilities and utilities associated with the plurality of target nodes; and displaying a candidate list of likely nodes to a user based upon the expected utility.

In accordance with another aspect of the present invention, a system is provided for determining a potential target node for directory operations. The system includes: means for assigning probabilities and utilities to a plurality of potential target nodes; means for determining an expected utility from the probabilities and utilities associated with the plurality of target nodes; and means for displaying a candidate list of likely nodes to a user based upon the expected utility.

According to yet another aspect of the present invention, a signal adapted to be transmitted between at least two processes is provided. The signal comprises a predicting component for communicating information associated with predicting a target file directory; and an analyzing component which analyzes probabilities and utilities associated with determining potential target directories via the signal for storing and accessing data.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
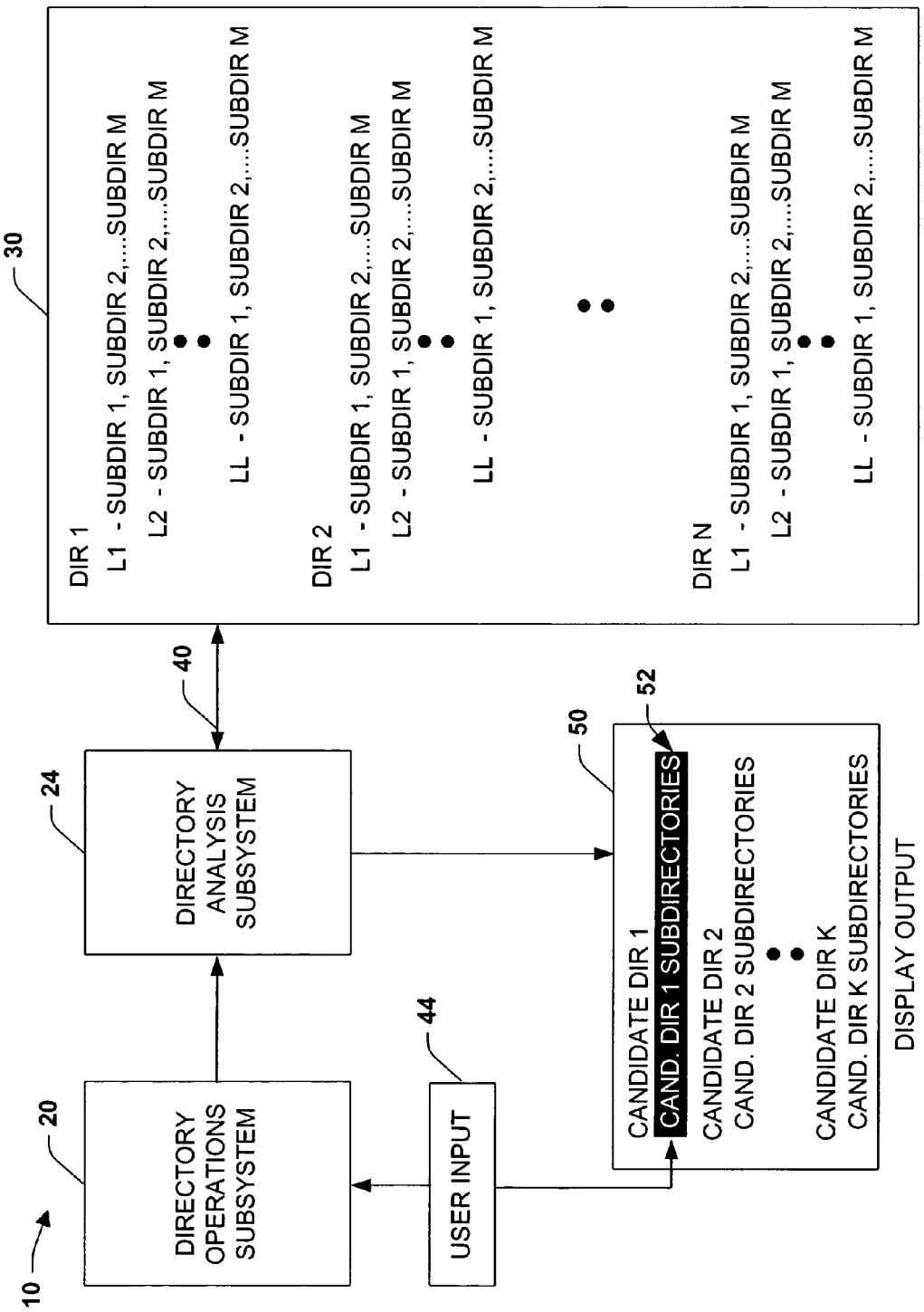
FIG. 1 is a schematic block diagram illustrating a directory analysis and display system in accordance with an aspect of the present invention.

The present invention is now described with reference to the drawings, wherein like reference numerals are used to refer to like elements throughout.

The present invention relates to a system and methodology to facilitate improved directory operations and manipulations within a local or remote computer system. This is achieved by providing a reduced subset of likely candidate directories that are determined based upon a decision-theoretic evaluation of expected utility that a potential target directory is the directory a user desires to access. In this manner, time is saved since users have fewer directories to traverse and smaller lists of nodes/files to peruse when searching for a destination directory.

Referring initially to FIG. 1, a system 10 illustrates a computer system with directory analysis and display in accordance with an aspect of the present invention. The system 10 includes a directory operations subsystem 20, and a directory analysis subsystem 24 that evaluates a directory tree structure 30 via interface 40. It is noted that the interface 40 may be a local bus connection within the computer system 10 for communicating with the local directory tree structure 30 and/or may be a remote connection, such as a network connection or wireless connection wherein the directory tree structure 30 resides on a remote computer system (not shown). In accordance with the present invention, a user invokes a directory operation via a user input 44 (e.g., mouse, keyboard) that is directed to the directory operations subsystem 20. The directory operations subsystem 20 may be invoked by substantially any application executing on the computer system 10. These operations may include file access, save, and browsing operations associated with the directory tree structure 30, for example. As an example, a text editing application may invoke a save operation directed to the directory tree structure 30 wherein the current file being edited is to be saved in an alternative directory node. Another example may include a file open operation wherein a subsequent file is to be opened along with the current file being operated upon by the user. Still yet another example of a directory operation may include a remote web access scenario (e.g., browsing) wherein a remote directory tree structure 30 (e.g., web site with associated directory levels). It is to be appreciated that substantially any directory operation that interfaces to the directory tree structure 30 may be employed in conjunction with the present invention.

After the user has initiated a directory operation via the directory operations subsystem 20, the directory analysis subsystem 24 evaluates the directory tree structure 30, and provides a reduced subset of selectable candidate nodes at a display output 50. This enables the user to select a directory or subdirectory from a minimal set of candidate nodes that are probabilistically determined to have a high likelihood of being the directory destination for the desired directory operation. For example, the user may be presented with a list of candidate directories 1 through K and associated subdirectories at the display output 50. If the user were to select a file open operation via the directory operations subsystem 20 for example, the user possibly may select subdirectory 1 shown at reference numeral 52 from the presentation of likely candidate directories 1 through K, K being an integer, in order to open a desired file. By selecting from the reduced subset of likely candidate directories 1 through K at display 50, time is saved and efficiency is increased since the user does not have to navigate, peruse and search through a plurality of possible and perhaps irrelevant directories and subdirectories in the directory tree structure 30 during directory operations. As illustrated, the directory tree structure 30 may include a plurality of directories, depicted as directories 1 through N, each directory associated with a plurality of possible levels of subdirectories, depicted as levels L1 through LL, and each subdirectory level including a plurality of possible subdirectories, depicted as subdirectories 1 through M, wherein L, M, and N are integers.

The directory analysis subsystem 24 evaluates the plurality of directories, subdirectory levels, and associated subdirectories in the directory tree structure 30 to provide a minimal/optimal set of likely directories and subdirectories in the display output 50 wherein the user selects from a few highly relevant alternatives when initiating directory operations. As will be described in more detail below, the directory analysis subsystem 24 utilizes a decision-theoretic analysis of the directory tree structure 30 in order to provide the reduced subset of candidate directories and subdirectories at the display output 50. The decision-theoretic analysis includes assigning probabilities to all nodes associated with the directory tree structure 30 as potential target nodes. The probabilities may include prior probabilities of node targets for document types saved within a longer term time horizon and more recent evidence of node activity, within a shorter time horizon of document content and activity to update potential target probabilities (e.g., increase the sample size of documents in directory folders). Expected utilities are then evaluated for each node. In the evaluation of each candidate or "target" node, the target itself is considered, and then nodes that are down one and two levels, and nodes that are up one level, and also down one level from the upper level. A list of display candidates is then started beginning with the node with the maximum expected utility and then removing that node from consideration. A re-evaluation of all nodes remaining in the directory tree structure 30 is then conducted, adding the new node, and scanning again to see that the new node is optimal before continuing to build a list of up to N display items. A list of all targets is then created and sorted by expected utility. The list is then displayed in a manner that preserves the overall utility ordering for each level of abstraction.

Figure 2:
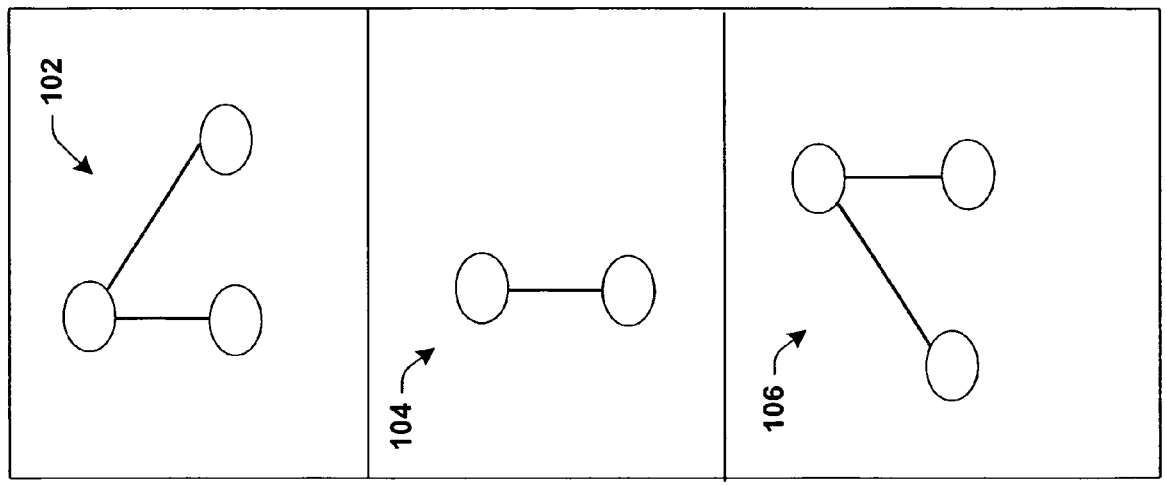
FIG. 2 is a diagram illustrating an exemplary node analysis and display subset in accordance with an aspect of the present invention.
Figure 2:
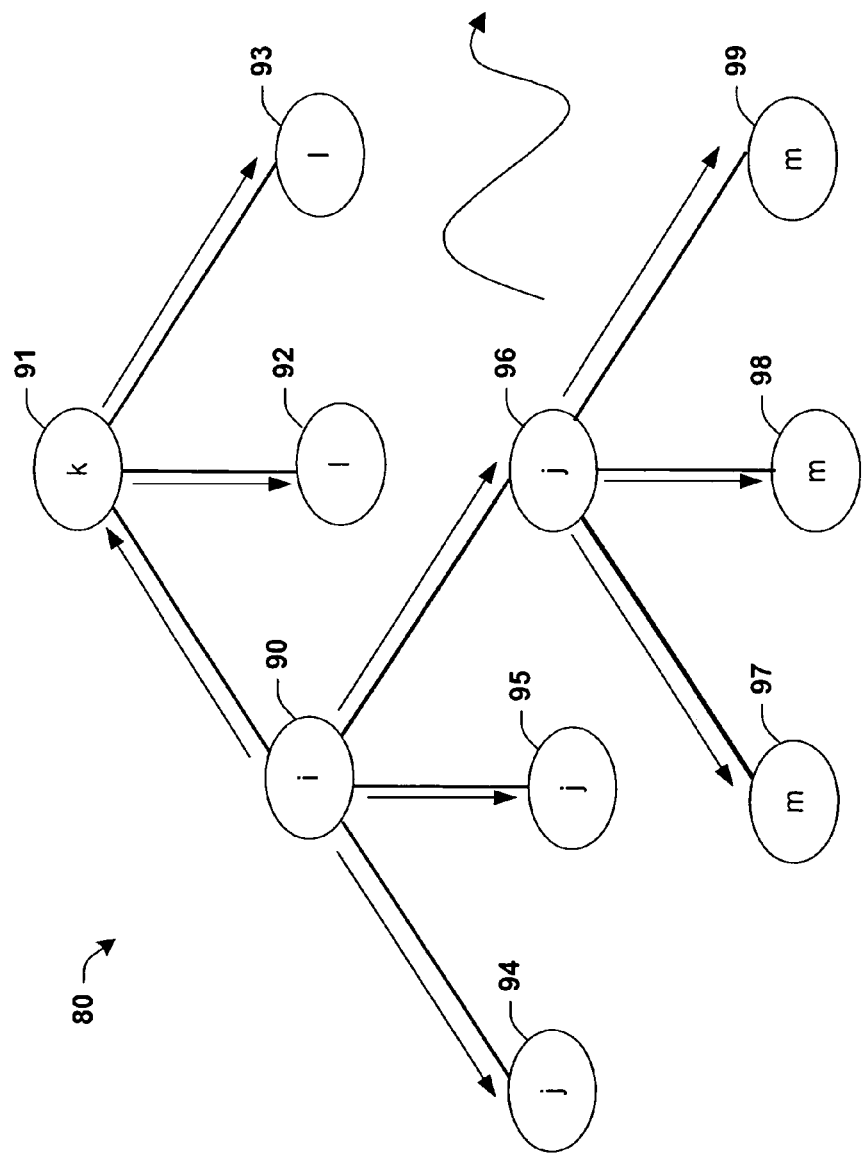

Referring now to FIG. 2, a directory tree structure 80 is illustrated in accordance with the present invention. It is noted that the directory tree structure 80 depicts an exemplary structure and that more or less directory nodes and node levels may be analyzed in accordance with the present invention. The directory tree structure 80 is represented by a plurality of directory nodes 90 through 99. Each node 90 through 99 is evaluated for expected utility wherein each node is assigned a value of being a likely destination or target node. Nodes may then be sorted and presented to the user as a subset of all the nodes under consideration based upon the expected utility determination. As an example, three possible exemplary node subsets are depicted at reference numerals 102, 104 and 106 that represent smaller subsets of the larger directory tree structure 80. By providing the user with a compact view of likely candidate directories such as node subsets 102–106, time is saved and efficiency is increased since the user does not have to peruse, search and navigate through all directory nodes 90–99 during directory operations.

The present invention provides a decision-theoretic node evaluation to order all target directories by expected utility to determine the node subsets. Each top-level directory (e.g., C:\, D:\), are followed by listings of more and more detailed targets. The top-level directories are thus ordered by expected utility. Each top-level directory is sorted and populated with the highest levels of the next level of detail by expected utility. The next levels of each subdirectory are then recursively populated, again by expected utility. A set of pruning heuristics may be employed to limit the size of the set of files contained by each top-level directory (e.g., by considering a maximum size as well as a minimum expected utility).

In order to determine the node subsets 102–106, a target node (i), 96 may first be evaluated for expected utility. As illustrated, the target (i) 90 has a parent node (k) 91 that has two other associated nodes at level (l), 92 and 93. The target (i) 90 has three sublevel nodes (j) 94–96 wherein one of the (j) levels 96 also has three exemplary sublevel nodes (m) 97–99.

For each node 90–99, a probability is assigned that the node is a target node, such that p(Target i|Recent, Long-term Evidence) as will be described in more detail below. For each node under consideration such as the target node (i) 90, an evaluation of the children of that node $j_1 \ldots j_n$ 94–96 and the parent of the node, k and its children one level down, $l_1 \ldots l_n$ may be conducted, for example. It is to be appreciated that other nodes (not shown) may also be included in the determination. The expected utility of a potential target node is the probability that the node is the target node weighted by the utility of that node being the target, then summed together with the probabilities that the target location is in some near proximity to the target, weighted by the utility of making a navigational move to an adjacent node from the target and the cost of reviewing a list associated with the navigation.

Figure 3:
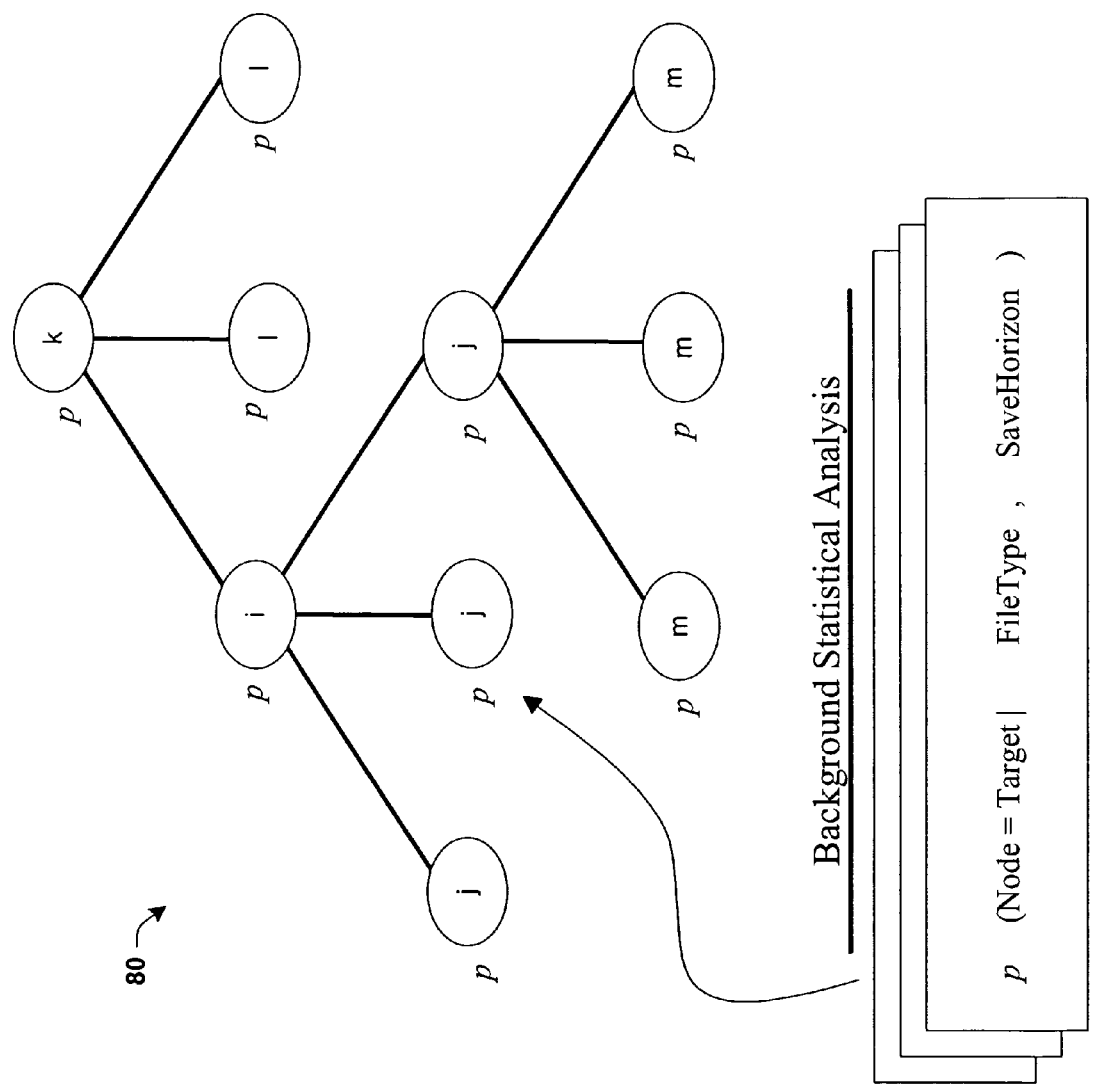
FIG. 3 is a diagram illustrating assigning background probabilities to nodes under consideration in accordance with an aspect of the present invention.
Figure 4:
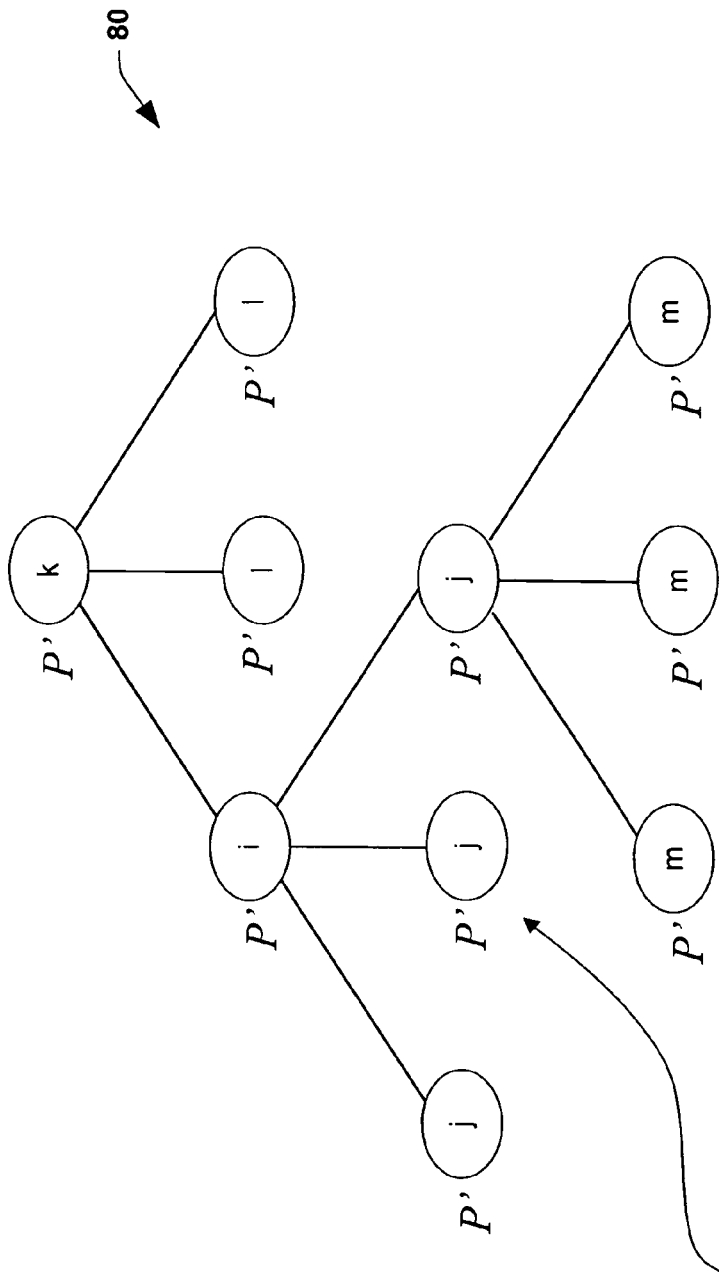
FIG. 4 is a diagram illustrating updating node statistical probabilities with recent activity in accordance with an aspect of the present invention.
Figure 5:
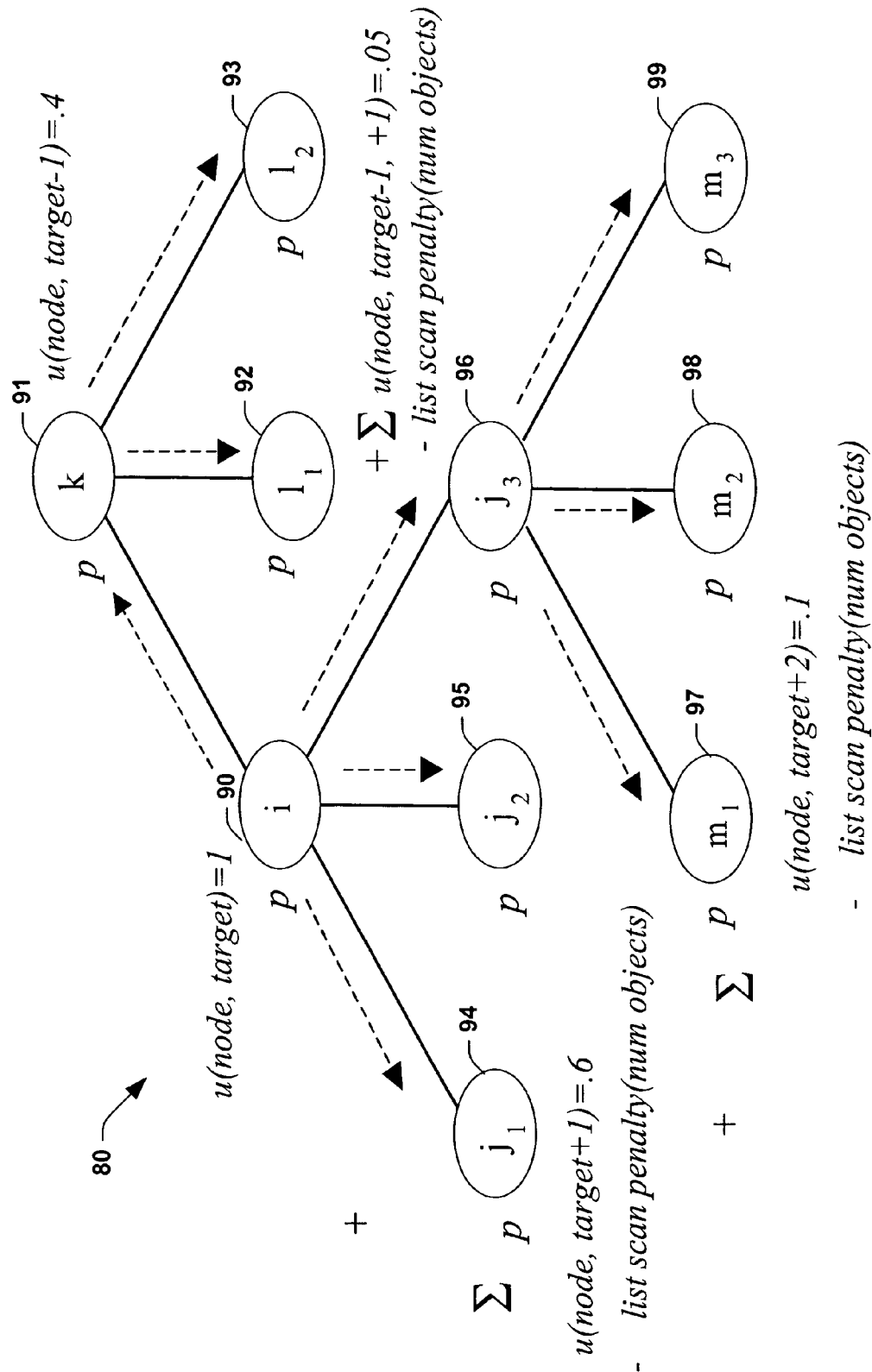
FIG. 5 is a diagram illustrating a decision-theoretic evaluation of nodes in a sub-level and higher-level structure in accordance with an aspect of the present invention.

Referring now to FIGS. 3–5, a more detailed description is provided for the expected utility determination and decision-theoretic evaluation described above. Turning initially to FIG. 3, background probabilities are determined and assigned to each node in the directory tree structure 80. These probabilities may be determined from a plurality of factors that indicate that a potential node is a likely target node. For example, a predetermined file activity horizon may be defined for all files in each node in the directory tree structure 80. For example, each file in each directory node may be checked for file activity within an amount of time (e.g., check file save operations within the last 2 weeks). Directory nodes with more files that have been saved and/or acted upon within the predetermined amount of time are assigned higher probabilities of being the target node.

Referring now to FIG. 4, the background probabilities described above may be updated in real-time and based upon more recent file and directory activities associated with a particular application and/or file type. These probabilities may include the frequency that a particular file and/or directory has been accessed by the user. For example, these probabilities may be determined from file similarities associated with an application. If a text file is being saved or opened for example, nodes containing large numbers of text files will have a higher probability of being a target node than nodes containing large numbers of drawings files. Other factors may include determining document or item similarities (e.g., with a cosine similarity metric for text similarity or a classification technology that provides a probability that an item belongs in a category based on its content), and may include a language model analysis of the files within each node, wherein file elements or structures within each file may be compared with the current file being operated upon by the user. Still other factors may include long and short term statistical analysis based upon application type.

For example, it may be determined that a particular user generally saves text applications in one high-level directory (e.g., C:/documents) and generally saves spread sheet applications in another high-level directory (e.g., D:/spread sheet). Depending on the directory operation to be performed from a particular application, the probabilities assigned to each node may thus change. It is to be appreciated that a background monitor can be included with the computer system described above to monitor file and directory activities associated with the user actions. In other words, the background monitor can determine how frequently a particular file has been accessed by associating a counter with each file, and updating the counter each time the file and/or directory operation is attempted by the user. Frequency can be determined by dividing the number of counts in the counters over a predetermined time period. Thus, files with a higher frequency of access may be assigned higher probabilities.

Turning to FIG. 5, a decision-theoretic evaluation of the tree structure 80 is illustrated in accordance with the present invention. As described above in relation to FIGS. 3 and 4, all nodes in the tree structure 80 are assigned background probabilities and are updated in real time with probabilities that are associated with the type of application being operated upon. After the probabilities have been assigned, a utility factor is assigned to each node. The utility factor assigns a penalty for navigating to an adjacent node to perform a directory operation. For example, when the target (i) node 90 is under evaluation, the utility factor may be set to (1) since there are no assumed penalties associated with staying at the target node (i). If traversing down one level to nodes (j) 94–96, a utility factor may be assigned as 0.6, for example. It is to be appreciated that the utility factor may be assigned by the user at run time, and/or may be encoded as default values for each level of navigation. If traversing down two levels to nodes (m) 97–99, a utility factor may be assigned as 0.1, for example. Similarly, if traversing up one level to node (k) 91 the utility factor may be assigned 0.4 and similarly, up one level and down one level to nodes (l) 92, 93 a utility factor may be assigned as 0.05, for example. It is noted that these utility factors are provided for exemplary purposes and may be assigned or encoded as substantially any factor that provides a penalty for navigating to an adjacent node.

A list scan penalty may also be assigned to each node in the directory tree structure 80. The list scan penalty assigns a penalty for displaying a number of items in a list. For example, an exponential function (e.g., $Size^{1/n}$) may be selected as a penalty function, wherein N is an integer and represents the number of files in the list. In the example tree structure depicted by the tree structure 80, no scan penalty is assigned to node (k) 91, since this node would appear by itself, without any other nodes on the (k) level, in a list of nodes. Nodes (j) 94–96 on the other hand, are each associated with three items at the (j) sublevel. Likewise, nodes (m) 97–99 are each associated with three items at the (j) sublevel and are thus assigned a list scan penalty.

After assigning the utility factor and list scan penalties to all nodes in the directory tree 80, an expected utility evaluation for each node can proceed. This involves evaluating each node in the directory tree structure 80 as a potential target node. For example, the target node (i) 90 may be the first node to be considered. For each node in the tree structure 80 a multiplication occurs utilizing the probabilities determined for that node multiplied by the utility factor and list scan penalty to navigate to that node to create an expected utility product for each node. The expected utility for a node, such as the target node (i) 90, is then the sum of all the expected utility products for each node 90–99. The following equation illustrates this computation of the expected utility for the target node (i) 90.

Equation 1:

$$EU(\text{Target } i) = \\
p(\text{Target } i)(l) + \sum_{j=1 \ldots n} p(T=j) * u[\text{Target is } j, \text{Guess is } i, f(n)] + \\
p(T=k) * u[\text{Target is } k, \text{Guess is } i,] + \\
\sum_{l=1 \ldots m} p(T=l) * u[\text{Target is } l, \text{Guess is } i, f(m)] + \\
\sum_{m=1 \ldots o} p(T=m) * u[\text{Target is } m, \text{Guess is } i, f(o)] + \\
p(\text{Elsewhere}) * u[\text{Target is elsewhere}, \text{Guess is } i]$$

wherein n, m, and o are integers, and p(Elsewhere) is 1–(the sum of all of the probabilities in consideration for node i). Thus, p(Elsewhere)=1–[p(Target i)+Σ$_{j=1 \ldots n}$ p(T=j)+p(T=k)+Σ$_{l=1 \ldots m}$ p(T=l)]. Equation 1 can be simplified by dropping the last term of Equation 1 by setting the utility of u[Target is elsewhere, Guess is i, f(m)] to zero. Thus, the following Equation may be employed:

Equation 2:

$$EU(\text{Target } i) = \\
p(\text{Target } i)(l) + \sum_{j=1 \ldots n} p(T=j) * u[\text{Target is } j, \text{Guess is } i, f(n)] + \\
p(T=k) * u[\text{Target is } k, \text{Guess is } i,] + \\
\sum_{l=1 \ldots m} p(T=l) * u[\text{Target is } l, \text{Guess is } i, f(m)] + \\
\sum_{m=1 \ldots o} p(T=m) * u[\text{Target is } m, \text{Guess is } i, f(o)]$$

wherein f( ) is the list scan penalty that grows as the number of items that need to be scanned grows. The utility factor can be considered as a list-scan size independent utility that is modified by the multiplicative factor, f(n). Thus, the utilities factors are assigned for navigating from one level to the next from the target node (i) under consideration. For example, if:

navigating down one level, then u[Target is j, Guess is i]=0.6*penalty with size of list navigating up one level, then u[Target is k, Guess is i]=0.4*penalty with size of list navigating down two levels, then u[Target is m, Guess is i]=0.1*penalty with size of list As described above, more or less directory sublevels may be similarly analyzed in accordance with the present invention, and that other utility factors assigned based on a user-assigned and/or encoded penalty for navigating from one sublevel to the next. After target node (i) 90 has been evaluated for expected utility, each node in the directory tree structure 80 may be similarly evaluated whereby that node (the node under evaluation) is made a potential target node and analyzed in relation to all other nodes. For example, node (j) 94 may next be analyzed for expected utility, wherein the node (j) 94 is analyzed similarly to target node (i) 90 described above. Similarly, all nodes in the directory tree structure 80 may be analyzed and assigned an expected utility.

Figure 6:
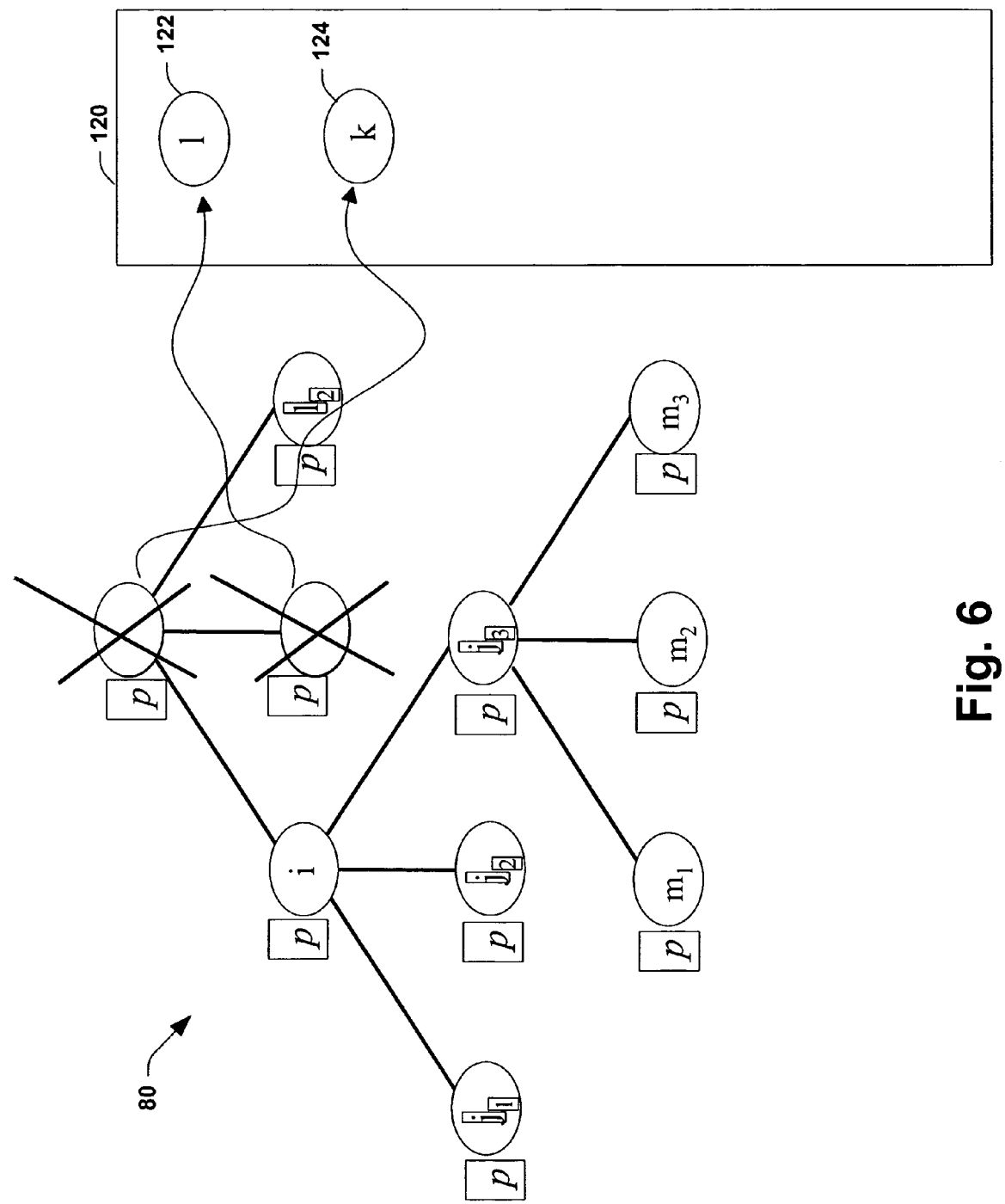
FIG. 6 is a diagram illustrating building a likely candidate list accordance with an aspect of the present invention.

Referring now to FIG. 6, a candidate list of relevant directory nodes is separated from the directory tree structure 80 after determining expected utility as described above in FIG. 5. A candidate list 120 is illustrated with two nodes 122 and 124 that have been sorted from the directory tree structure 80 based upon the expected utility that candidate nodes 122 and 124 are likely to be the desired destination/target directories for performing directory operations. According to this aspect of the invention, the list of candidates may be built by identifying a "best node", based upon the highest expected utility determined for all nodes in the directory tree structure 80. The node with the highest expected utility is then added to the list of candidates 120, and then removed from consideration. The expected utility evaluation described above is then repeated without the previously added node 122 being considered. The next best node is then determined based upon expected utility, and added to the list of candidates 120. For example, the node 122, may be the first node added to the candidate list 120 and is thus removed from consideration of the next expected utility calculation for the directory tree structure 80. The node 124, which may have the next highest expected utility and is then added to the list 120. The node 122, is then returned as an original node to the directory tree 80 and an expected utility determination is attempted again to determine if a summation of the candidate list 120 is greater than the prior list. If not, a return to the prior candidate list is provided, if so, the determination of the candidate list continues on until another candidate node is determined. This process is continued in this manner, with replacement of nodes from the candidate list 120 back into the directory tree structure 80 until reaching a max number of candidates or exhausting the search of the directory tree structure 80.

Figure 7:
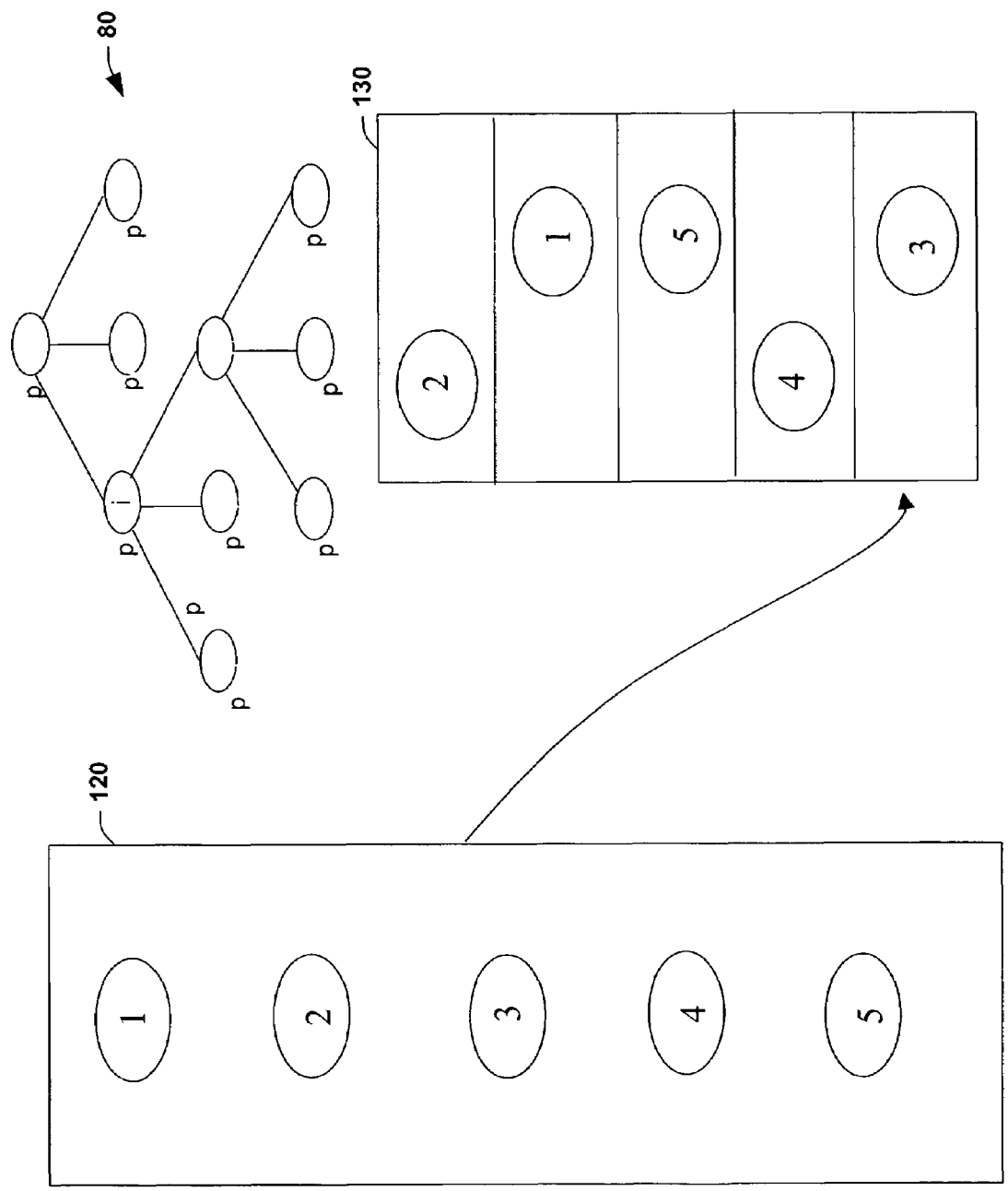
FIG. 7 is a diagram illustrating restructuring and re-sorting a candidate subdirectory by expected utility in accordance with an aspect of the present invention.

Referring now to FIG. 7, an exemplary output display of candidate nodes 120 is illustrated in accordance with the present invention. The nodes that where extracted in the expected utility determinations described above may be listed in order of expected utility as illustrated in the list 120. As an alternative, the final list 120 may be displayed by utility of items, wherein a display 130 is sorted with a metaphor defined by a global file system (e.g., dynamically created sub-trees created with indentation, and/or actual tree structure).

Figure 8:
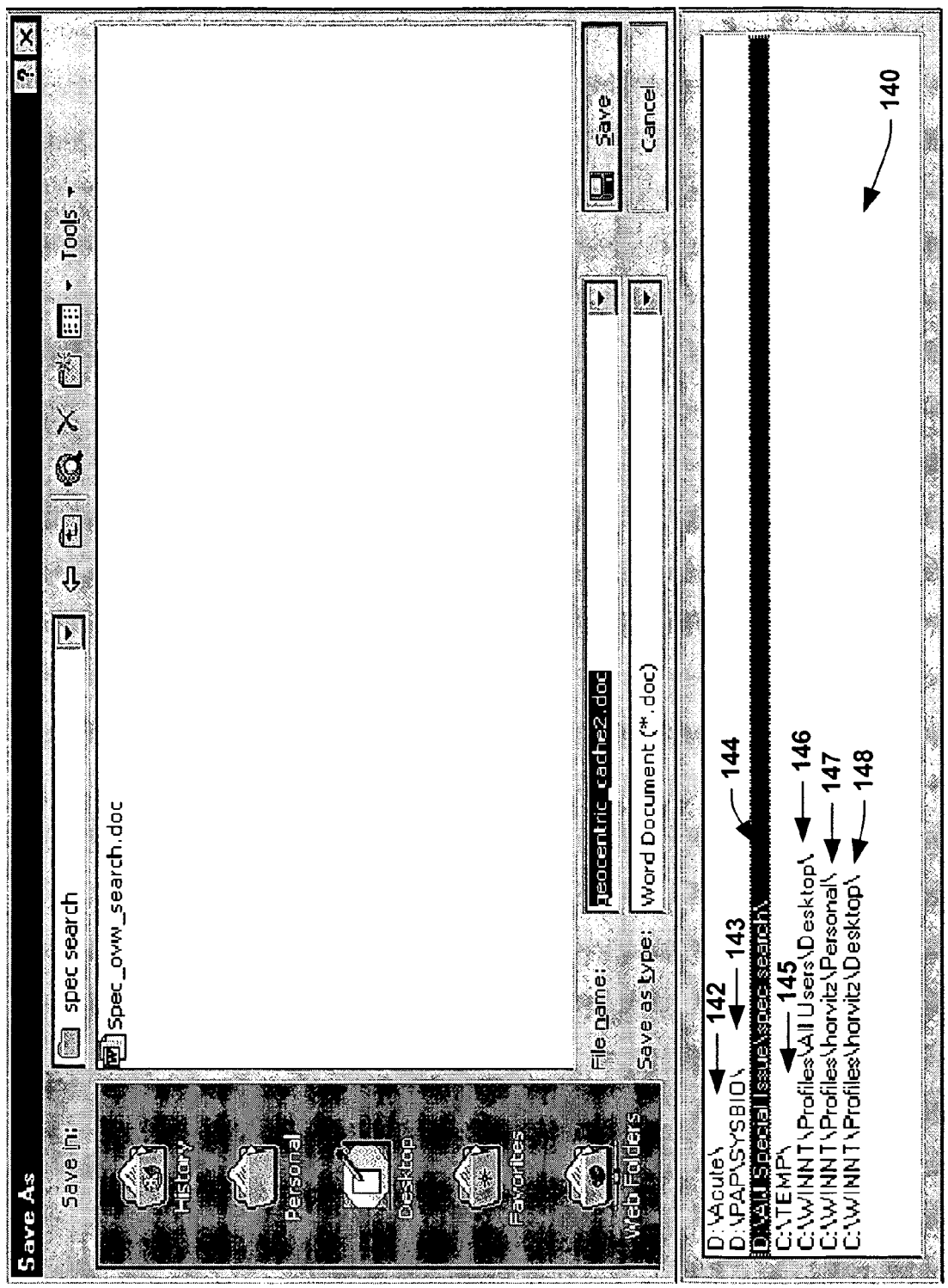
FIG. 8 is a diagram illustrating an exemplary display of a candidate directory structure in accordance with an aspect of the present invention.
Figure 9:
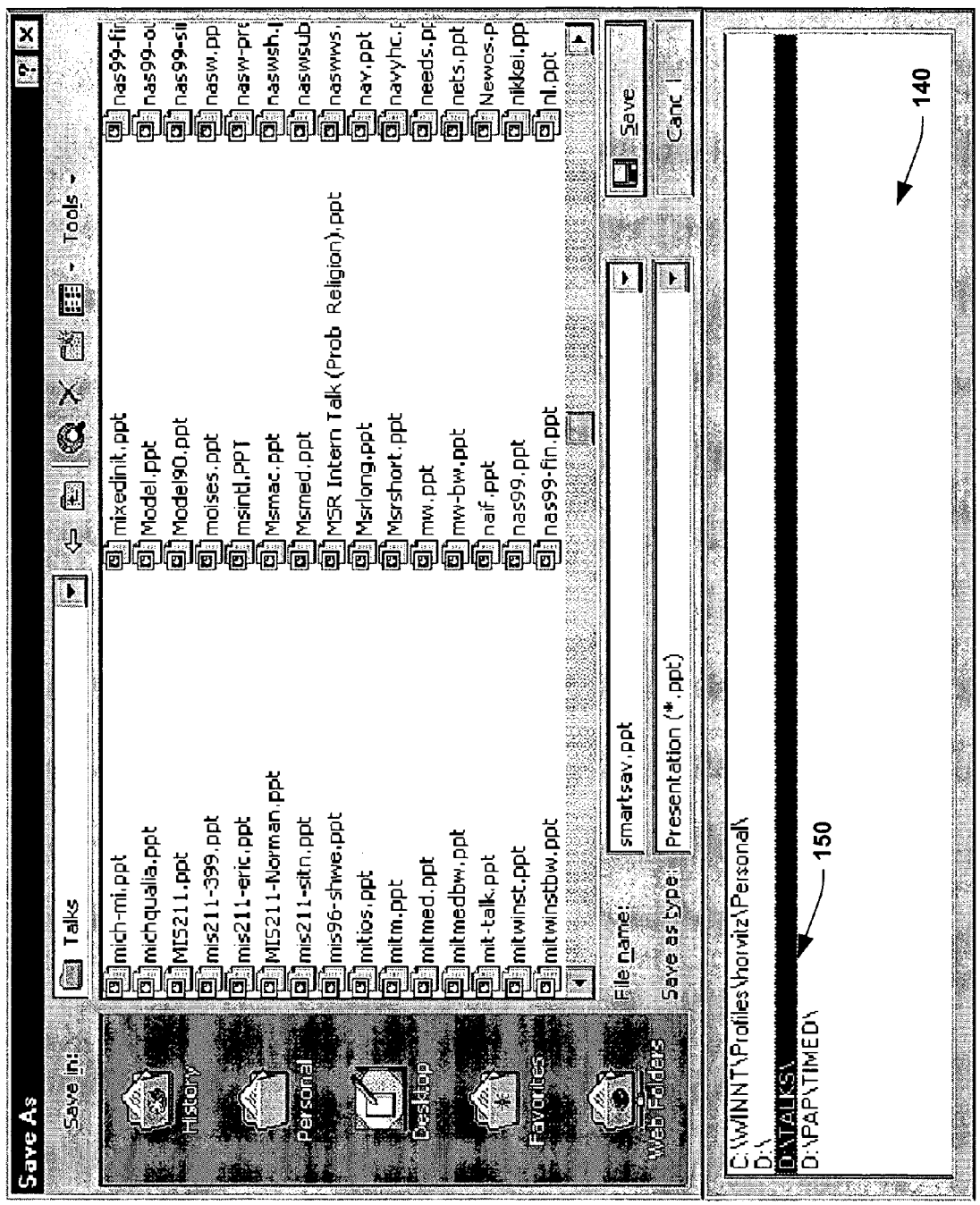
FIG. 9 is a diagram illustrating an exemplary display of an alternative candidate directory structure in accordance with an aspect of the present invention.

Referring to FIG. 8, an exemplary output display and candidate list is illustrated in accordance with the present invention. A user, may attempt a file "save as" operation as is well understood. It is to be appreciated that other directory operations such as open or browse may be similarly initiated. An auxiliary display window 140 may be provided in order to list display candidate directories 142 through 148. As described above, the entire directory structure of the local or remote computer may be analyzed to determine the candidate directories based upon expected utilities. As illustrated, a document type file is being saved in an alternative directory. The display 140 provides a sorted list based on expected utility and represents a reduced subset of directories that the user must search though in order to find a destination or target directory to save the document file. In this example, the user has selected the directory at reference 144 as the ultimate destination directory. In a similar example, a presentation file (e.g, Power Point) is saved as illustrated in FIG. 9. In this case, the user selects from the display 140 at reference 150 as the ultimate destination for the save operation.

Figure 10:
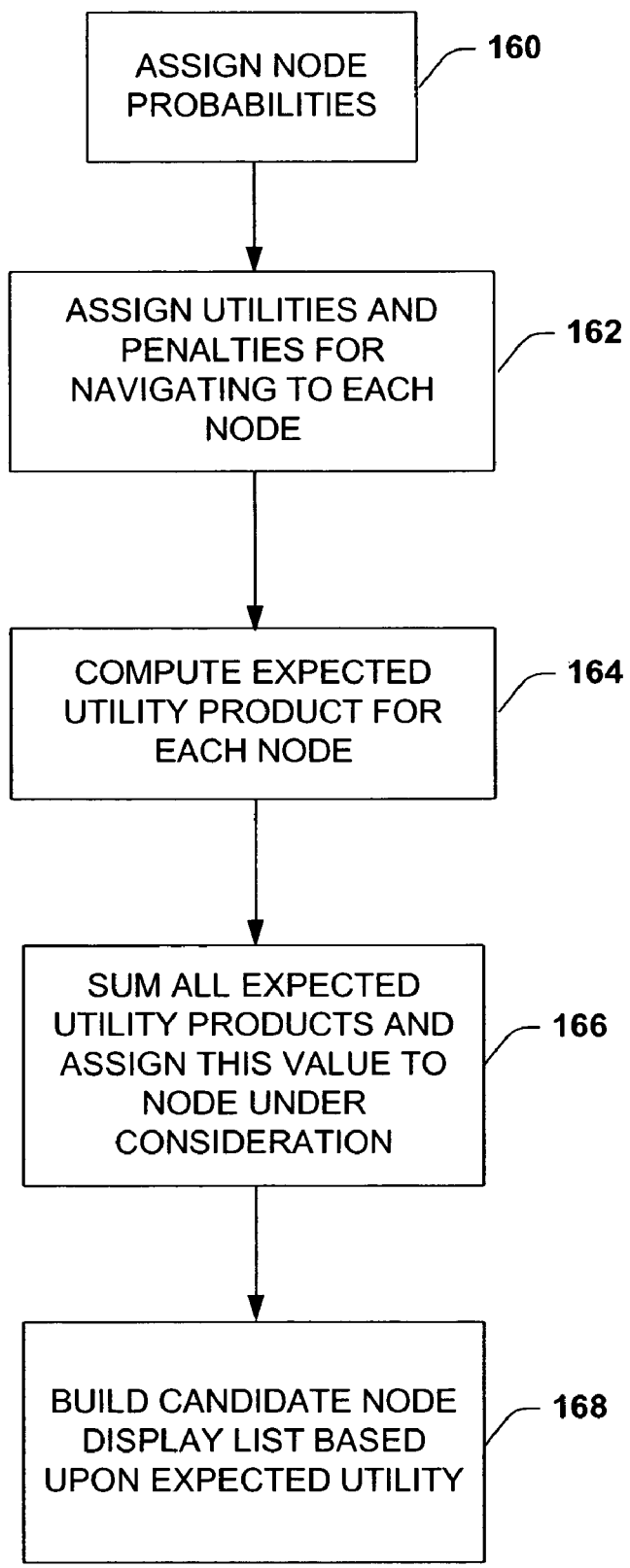
FIG. 10 is a flow diagram illustrating a methodology providing improved directory access in accordance with an aspect of the present invention.

FIG. 10 illustrates a methodology for providing improved directory access in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 10, and proceeding to 160, probabilities are assigned to each node under evaluation in a directory tree structure. As described above, this may be based on recent and/or long-term file activity. At 162, utilities and scan list penalties are assigned to each node under evaluation. Utilities reflect the cost of navigating up or down to another directory from the directory node currently under analysis. Scan list penalties are assigned as a function of the number of items appearing in a list associated with a node under evaluation. At 164, an expected utility product for each node under consideration is formed by multiplying the probabilities, utilities, and scan list penalties described above. At 166, all the expected utility products for all the nodes under evaluation are summed to determine an expected utility for the current node being evaluated as a potential target node. At 168, a candidate node display is constructed from the expected utility determinations performed in 166. The candidate node display enables a user to select from a reduced subset of directories when performing directory operations, and thus improve computer efficiency.

Figure 11:
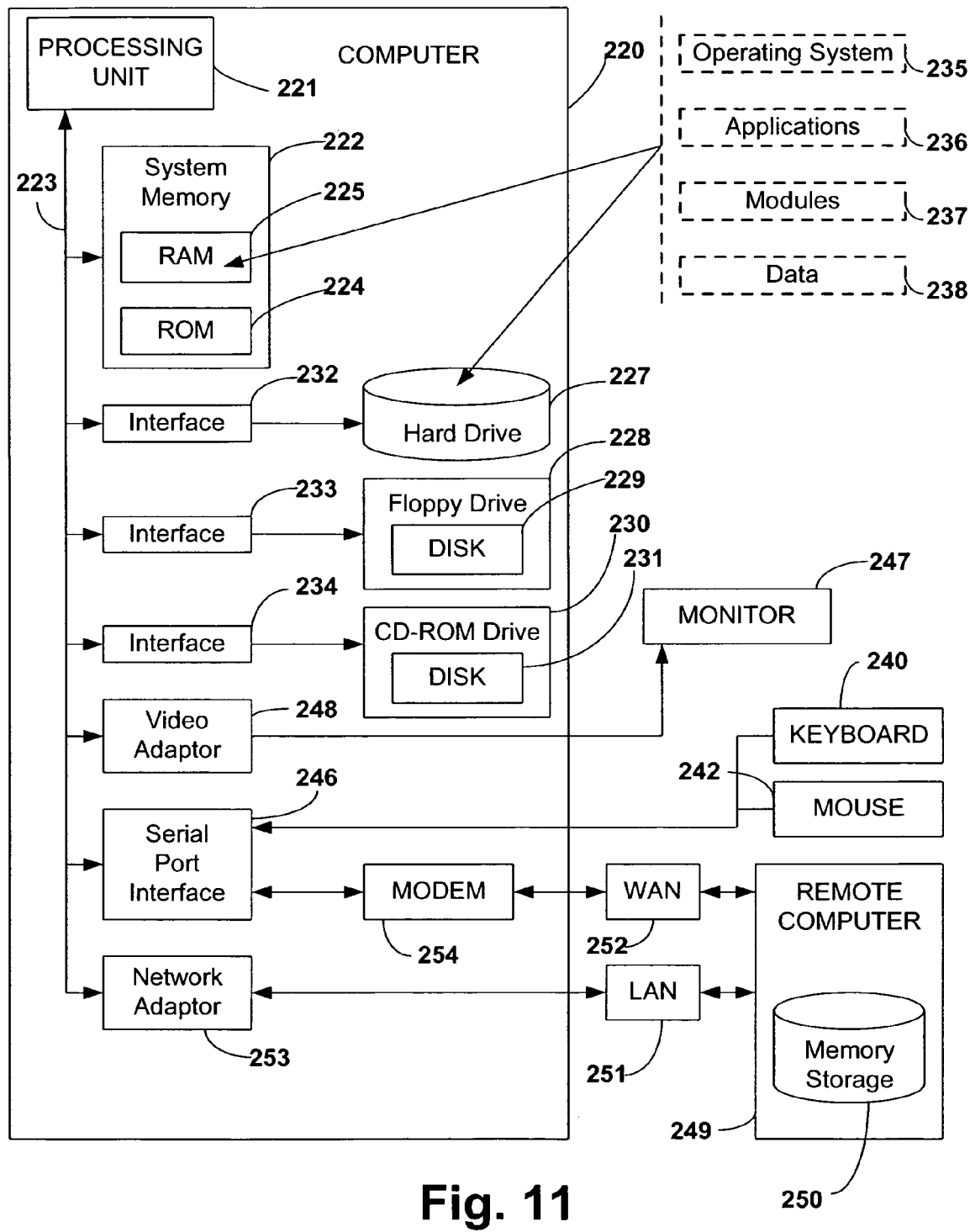
FIG. 11 is a schematic block diagram illustrating a suitable computing environment in accordance with an aspect of the present invention.

In order to provide a context for the various aspects of the invention, FIG. 11 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary system for implementing the various aspects of the invention includes a computer 220, including a processing unit 221, a system memory 222, and a system bus 223 that couples various system components including the system memory to the processing unit 221. The processing unit 221 may be any of various commercially available processors. Dual microprocessors and other multi-processor architectures also may be employed as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be any commercially available operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 11. The logical connections depicted in FIG. 11 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented system for predicting a target file directory, comprising:
   a first component that infers and/or determines expected navigation costs for directory operations associated with potential target directories, the expected navigation cost is based on a probabilistic and/or utility analysis that includes a list scan penalty for reducing probabilities associated with scanning lists within a directory; and
   a second component that outputs a subset of the potential target directories to a display, the subset is determined by selecting target directories, based in part on the expected navigation cost, in order to minimize a cost of traversing directories.

2. The system of claim 1, the utilities are functions of navigation costs associated with traversing from a node associated with a potential target directory under consideration to at least one of the other potential target directories.

3. The system of claim 1, the second component further determines the subset of directories based on expected utilities, which are computed as functions of probabilities of target information being at a node, and the navigation costs associated with traversing from the node to at least one of the potential target directories.

4. The system of claim 2, the navigation costs are assigned by at least one of user selections and encoded within the system.

5. The system of claim 1, the potential target directories are determined from at least one of a local computer system and a remote computer system.

6. The system of claim 1, the probabilities are a function of recent and long-term file activity within a directory.

7. The system of claim 6, the long term file activity is determined from a predetermined time horizon.

8. The system of claim 6, the recent file activity is determined from frequency of access to a file.

9. The system of claim 8, further comprising a background monitor to determine file access frequency.

10. The system of claim 1, the list scan penalty is determined as an exponential function that decreases as the number of elements on the list increases.

11. A method effectuated at least in part by a machine for determining a potential target node for directory operations, comprising:
    assigning probabilities and utilities to a plurality of potential target nodes, the utilities represent costs associated with navigating from a recommended node to an actual target node;
    determining a list scan penalty for reducing the probabilities associated with scanning lists within a directory;
    determining an expected utility from the probabilities and utilities associated with the plurality of target nodes; and
    displaying a candidate list of likely nodes to a user based upon the expected utility.

12. The method of claim 11, further comprising multiplying the assigned probabilities and utilities together to form a product at each of the plurality of target nodes.

13. The method of claim 12, further comprising summing the products from each of the plurality of target nodes together to determine the expected utility for one of the plurality of potential target nodes.

14. The method of claim 11, the utilities are related to navigation costs associated with traversing from a displayed directory to at least one of the potential target directories.

15. The method of claim 14, the navigation costs are assigned by at least one of user selections and encoded within the system.

16. The method of claim 11, the potential target nodes are determined from at least one of a local computer system and a remote computer system.

17. The method of claim 11, the probabilities are a function of recent and long-term file activity within a directory.

18. The method of claim 17, the long-term file activity is determined from a predetermined time horizon.

19. The method of claim 17, the recent file activity is determined from frequency of access to a file.

20. The method of claim 19, further comprising,
    monitoring a user to determine file access frequency.

21. The method of claim 11, the list scan penalty is determined as an exponential function that decreases as the number of elements on the list increases.

22. A machine implemented system for determining a potential target node for directory operations, comprising:

means for assigning probabilities and utilities to a plurality of potential target nodes;

means for determining a list scan penalty for reducing the probabilities associated with scanning lists within a directory;

means for determining an expected utility from the probabilities and utilities associated with the plurality of target nodes; and means for displaying a candidate list of likely nodes to a user based upon the expected utility, the candidate list comprises a subset of the potential target nodes.

23. The system of claim 1, the second component outputs the subset of directories as tree fragments.

24. The system of claim 1, the subset comprises N potential target directories, N is an integer that is predefined.

25. The system of claim 1, the subset comprises directories with expected navigation costs below a predetermined level.

26. The method of claim 11, displaying the candidate list in descending order from highest expected utility.

27. The method of claim 13, further comprising removing a potential target node with a maximum expected utility from consideration when evaluating expected utility for the other potential target nodes.

* * * * *

UNITED STATES PATENT AND TRADEMARK OFFICE
CERTIFICATE OF CORRECTION

PATENT NO. : 7,039,642 B1
APPLICATION NO. : 09/849644
DATED : May 2, 2006
INVENTOR(S) : Eric J. Horvitz et al.

It is certified that error appears in the above-identified patent and that said Letters Patent is hereby corrected as shown below:

On page 2, in Item (56), under "Other Publications", in column 2, line 19, delete "Interence" and insert -- Inference --, therefor.

In column 9, line 12, after "Guess is" delete "i,]" and insert -- i] --, therefor.

In column 9, line 35, after "Guess is" delete "i,]" and insert -- i] --, therefor.

Signed and Sealed this

Thirtieth Day of March, 2010

David J. Kappos
*Director of the United States Patent and Trademark Office*